United States Patent [19]

Ando

[11] Patent Number: 4,857,719
[45] Date of Patent: Aug. 15, 1989

[54] FLAT TYPE OPTICAL HEAD FOR FOCUSING A LIGHT BEAM ONTO AN OPTICAL MEMORY

[75] Inventor: Hideo Ando, Kawasaki, Japan
[73] Assignee: Kabushiki Kaisha Toshiba, Kawasaki, Japan
[21] Appl. No.: 165,937
[22] Filed: Mar. 9, 1988

[30] Foreign Application Priority Data

Mar. 10, 1987 [JP] Japan .................................. 62-54641

[51] Int. Cl.⁴ .............................................. G01J 1/20
[52] U.S. Cl. ...................................... 250/201; 369/44
[58] Field of Search ................... 250/201 AF; 369/44, 369/45, 46; 365/109, 110, 111, 112, 234

[56] References Cited

U.S. PATENT DOCUMENTS 4,085,423 4/1978 Tsunoda et al. ...................... 369/45
4,216,357 8/1980 Iwasaki et al. ......................... 369/46

Primary Examiner—David C. Nelms
Assistant Examiner—Eric F. Chatmon
Attorney, Agent, or Firm—Finnegan, Henderson, Farabow, Garrett, & Dunner

[57] ABSTRACT

In a flat type optical head for focusing a light beam, a semiconductor laser is mounted on a mount which is fixed on a base. A Fresnel lens structure is formed on optical detecting layer which is formed on the base. A laser beam generated from the semiconductor layer is incident on a converging layer of the Fresnel lens structure and is conveyed on an optical disk by the converging layer. The laser beam reflected from the optical disk is returned to the conveying layer. A part of the laser beam passes through the converging layer and is detected by the optical detecting layer.

16 Claims, 7 Drawing Sheets

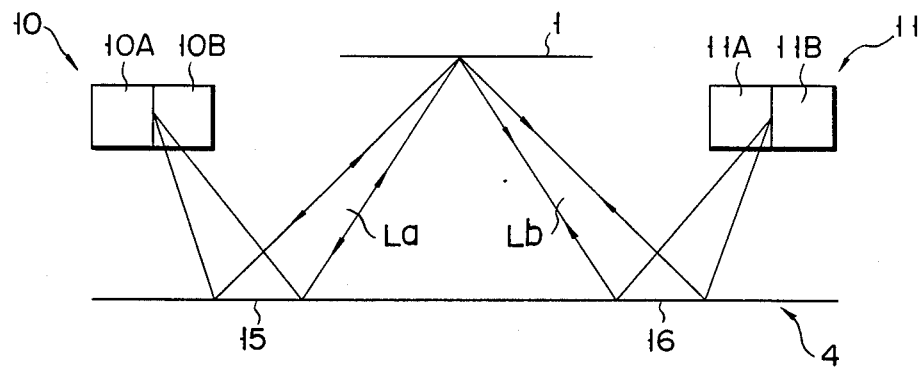
F I G. 4A
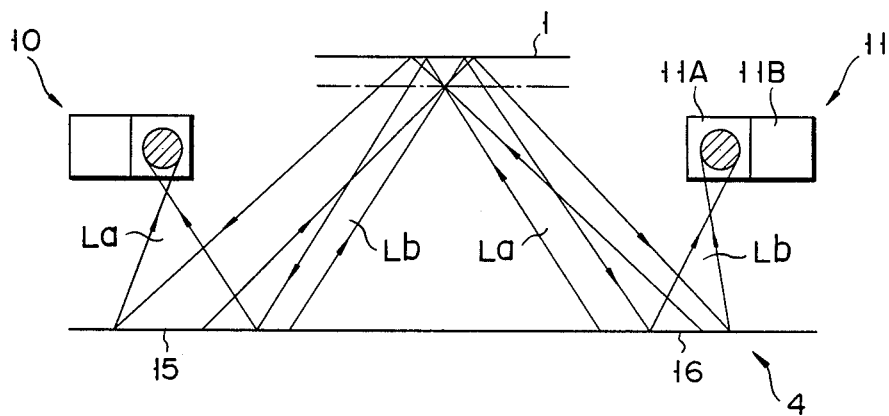
F I G. 4B
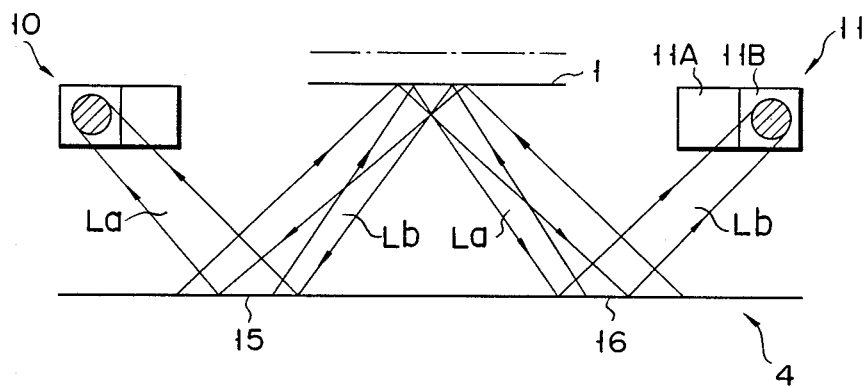
F I G. 4C

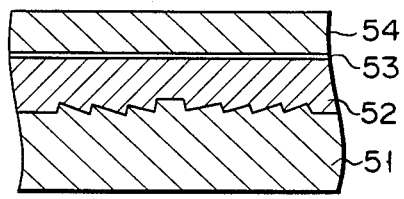
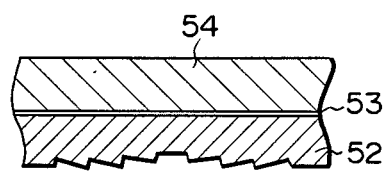
F I G. 5E              F I G. 5F
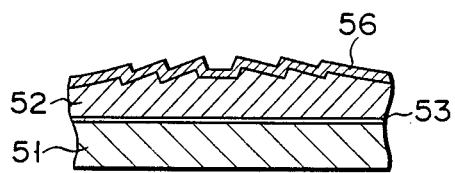
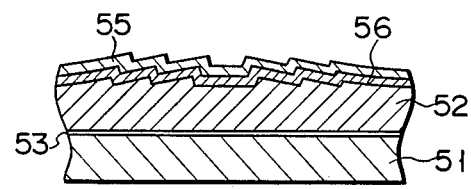
F I G. 5G              F I G. 5H
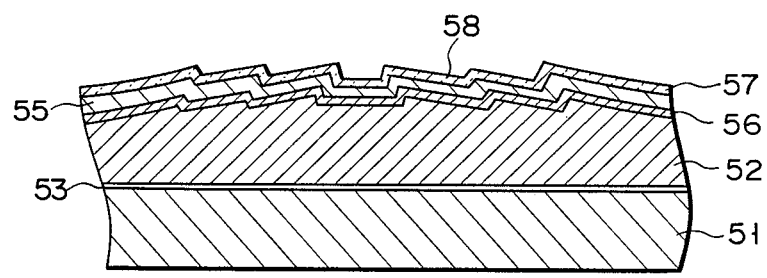
F I G. 5I

FLAT TYPE OPTICAL HEAD FOR FOCUSING A LIGHT BEAM ONTO AN OPTICAL MEMORY

BACKGROUND OF THE INVENTION

1. Field of the Invention

This invention relates to a flat type optical head for focusing a light beam onto an optical memory and more particularly to a flat type optical head which is incorporated in an optical information retrieving system that uses a light beam to reproduce information from an optical memory.

2. Description of the Related Art

In the information retrieving system, an optical head is used to focus a light beam onto an optical memory. As disclosed in U.S. Pat. Nos. 4,023,033 and 4,641,023, the optical head generally comprises a light source for generating a light beam, an objective lens, which is constituted of a convex lens, for focusing the light beam emitting from the light source onto an information recording medium or optical memory and a beam splitter for directing the light beam reflected from the optical memory and coming out of the objective lens to the light detector.

As is obvious from its construction, the optical head has a limitation in miniaturization; it is difficult to reduce in size, weight and height. Due to the difficulty in miniaturization of the optical head, it is difficult to miniaturize information retrieving systems in which the optical head is used. Furthermore, due to the difficulty in reducing the weight of the optical head, the optical head moving mechanism in the information retrieving systems has to be large, thus imposing restraints on speeding up the access to information.

SUMMARY OF THE INVENTION

The object of this invention is to provide a flat type optical head capable of miniaturization, reduction in weight and high speed access.

In order to achieve the above object, a flat type optical head comprises means for generating a light beam; reflecting means having a first reflecting surface on which the light beam is incident, which reflects the light beam and which converges the light beam toward the optical memory; and first detecting means for detecting a first light beam which is incident on the optical memory and is reflected therefrom and for generating a first signal.

BRIEF DESCRIPTION OF THE DRAWINGS

FIGS. 4A through 4C are schematic diagrams of the focus detection optical system illustrating the method of detecting a focusing state in the optical head shown in FIGS. 1 and 2;

FIGS. 5A through 5I are sectional views schematically showing the process of producing the structure of the Fresnel mirror of FIG. 1;

DETAILED DESCRIPTION OF THE PREFERRED EMBODIMENTS

Figure 1:
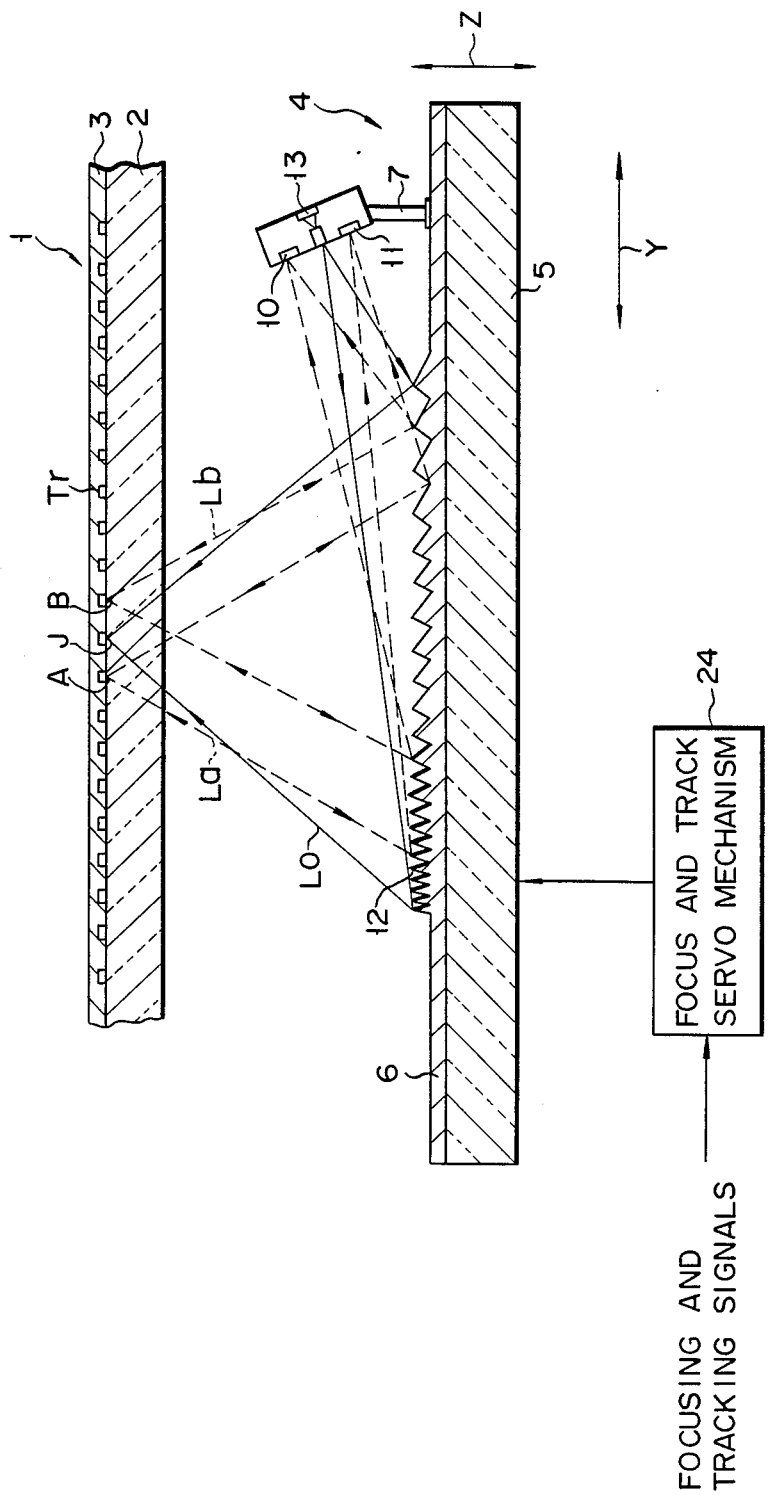
FIG. 1 is a sectional view schematically showing a flat type optical head having a structure of a Fresnel mirror according to an embodiment of this invention.
Figure 2:
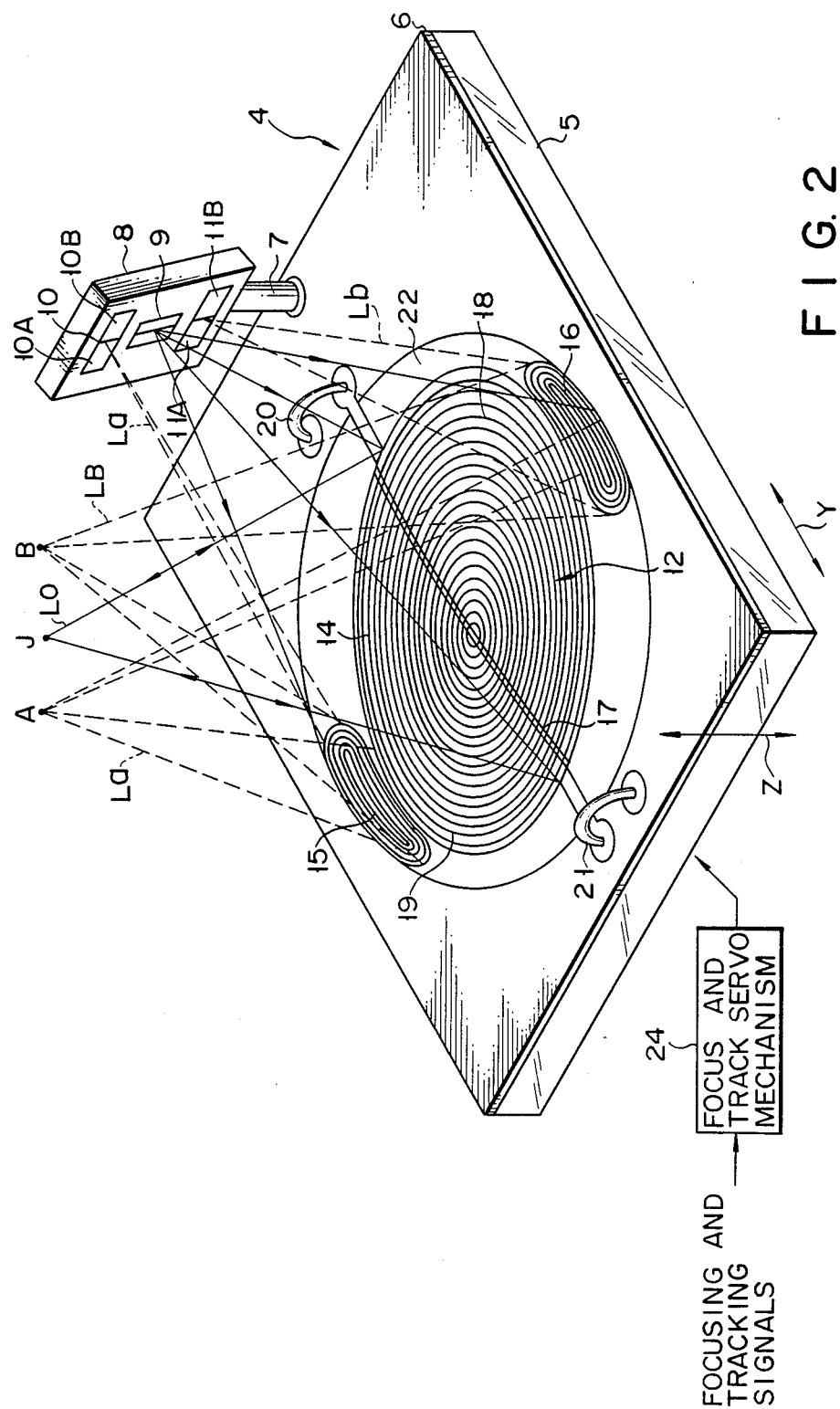
FIG. 2 is a perspective view showing the flat type optical head shown in FIG. 1.
Figure 3:
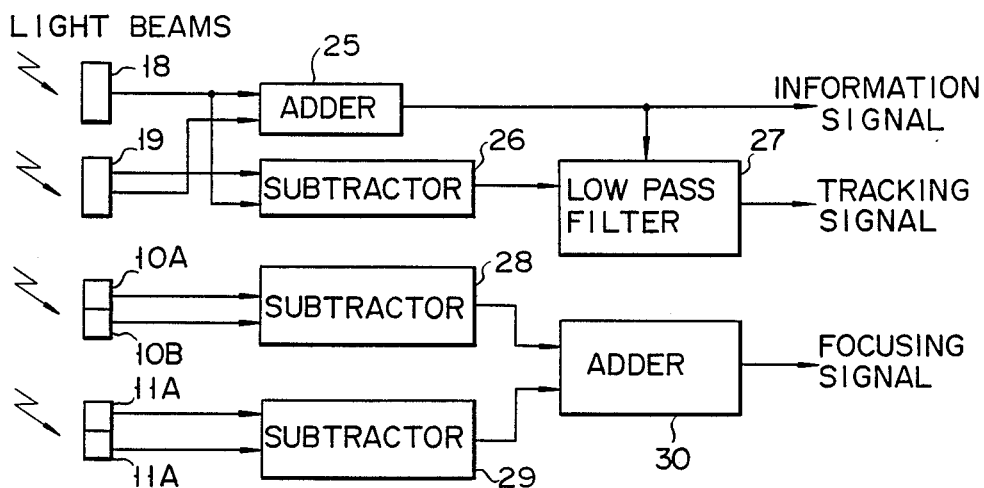
FIG. 3 is a block diagram of a processing circuit to process signals from the flat type optical head shown in FIGS. 1 and 2.

FIGS. 1 and 2 show a flat type optical head according to an embodiment of this invention. In these figures, the numeral 1 represents an optical memory such as an optical disk, optical card, compact disk or a video disk. As is generally known, optical memory 1 is generally made by forming record layer 3 on transparent substrate 3. Provided in the form of circular grooves or circular rejections on optical memory 1 are tracking guides Tr having a function of specifying an area where information is to be recorded. Facing transparent substrate 2 of optical memory 1, flat type optical head 4 is located to face the optical disk 1 with a gap of 1.5 mm to 3.0 mm. This optical head 4 is supported by focus and track servo mechanism 24 movably in the Y and Z directions. This optical head 4 is provided with an optical detecting layer 12 which is formed on a base 5 made of a substrate material such as a float glass and light beam converging layer 6 having a Fresnel lens structure formed on detecting layer 12. As for the manufacturing method of this light beam converging and light-detecting layer 4, which will be described in later. Converging layer 6 has a Fresnel reflecting surface that reflects a divergent beam incident on the surface at specific incident angles and functions as a concave mirror to converge the beam at a convergent point. Detecting layer 12 is provided in a specified area of the above reflective surface. Mount 8 is fixed to using support leg 7 on base 5 of optical head 4. Mounted on the front face of mount 8 are semiconductor laser 9 that generates the laser beam, first and second detectors 10 and 11 each having a pair of detection regions 10A, 10B and 11A and 11B, respectively. On the reverse side of mount 8, there is provided monitoring detector 13 which faces the reverse side of semiconductor laser 9 and monitors semiconductor laser 9. Semiconductor laser 9 is connected to a driving circuit (not shown). Monitoring detector 13 is connected a monitor circuit (not shown) which generates monitor signals. First and second detectors 10 and 11 are connected to processing circuits as shown in FIG. 3.

The converging layer 6 in a Fresnel lens structure has a main Fresnel reflecting region 14 that reflects most of the incident laser beam and auxiliary Fresnel reflecting regions 15 and 16 on both sides of main Fresnel reflecting region 14. These regions are preferably divided by peripheral region 22 -which is formed as an irregularly reflecting or nonreflecting surface. The region of optical detecting layer 12 of main Fresnel reflecting region is divided by light-nondetecting region 17 and separated into first and second detecting regions 18 and 19, which are respectively connected to bonding wires 20 and 21 and the bonding wires 20, 21 are connected to the processing circuits of FIG. 3 which generate tracking error signals and information signals.

In the optical head of the aforementioned construction, a laser beam for reproduction having a constant intensity or a laser beam for recording, which has been intensity-modulated according to information to be recorded, is emitted from the front face of semiconductor laser 9 toward main Fresnel reflecting region 14 and auxiliary Fresnel reflecting regions 15 and 16. The laser beam for monitoring emanates from the reverse side of semiconductor laser 9 and is detected by light detector 13 for monitoring. Signals from this detector 13 serves to stabilize the laser beam from semiconductor laser 9. The divergent laser beam Lo emitted to main Fresnel reflecting region 14 is diffracted by region 14 and converged at convergence point J. When this convergence point J is formed on record layer 3 of optical memory 1, optical head 4 is defined as being in a focused state. If, under this focused state, a laser beam for reproduction is applied on record layer 3, this laser beam for reproduction is intensity-modulated in the record area such as a pit in the tracking guide Tr in record layer 3 and reflected from this record layer 3. Similarly, if an intensity-modulated laser beam for recording is radiated to the record layer while the optical head is in the focused state, a record area is formed by this laser beam for recording in the tracking guide Tr in record layer 3. The laser beam Lo reflected from record layer 3 is directed to main Fresnel reflecting region 14 and mostly reflected but the laser beam Lo is detected by optical detecting layer 12 on reflecting region 14. The laser beams incident on first and second light detecting regions 18 and 19 of light detecting layer 12 are converted into the first and second detection signals, a signal of their sum is obtained by adder 25 and desired information is reproduced by eliminating a bias component corresponding to that part of the laser beam which is directly incident on optical detecting layer 12 on main Fresnel reflecting region 14 and converted into a signal component. When reflected by record layer 3, the laser beam is diffracted by the tracking guide Tr. As a result, a diffraction pattern is formed as a dark area in either or both of first and second light detecting regions 18 and 19 of light detecting layer 12. Therefore, when the laser beam Lo is tracing the tracking guide correctly, the first and second signals of equal level are generated from first and second light detecting regions 18 and 19 of light detecting layer 12 and a track error signal of zero level difference is supplied from subtractor 26. A bias component which is directly incident on detecting layer 12 on main Fresnel reflecting region 14 from semiconductor laser 9 and converted into a bias component is removed by obtaining the difference from subtractor 26. When the laser beam is not tracing the tracking guide correctly, the first and second signals of different levels are generated from first and second light detecting regions 18 and 19 of detecting layer 12 and a high frequency component corresponding to an information signal is removed by a low pass filter and a track error signal of plus or minus level is generated by subtractor 26. According to this track error signal, optical head 4 is moved by focus and track servo mechanism 24 in the Z direction, thereby keeping optical head 4 in the condition that the laser beam Lo follows the tracking guide. Thus, tracking errors are detected by the so-called push-pull method.

The divergent laser beams La and Lb directed toward first and second auxiliary Fresnel reflecting regions 15 and 16, when reflected, are diffracted and converged respectively at convergence spots A and B. When optical head 4 is in the focused state, convergence spots A and B, for example, are formed on record layer 3, the laser beam La reflected from first auxiliary Fresnel reflecting region 15 is reflected at convergence spot A on record layer 3 and directed to second auxiliary Fresnel reflecting region 16 as shown in FIG. 2. On the other hand, the laser beam Lb reflected from second auxiliary Fresnel reflecting region 16 is reflected at convergence spot B on record layer 3 and directed to first auxiliary Fresnel reflecting region 15. Then, the laser beams La and Lb reflected from first and second auxiliary Fresnel reflecting regions 15 and 16 are directed respectively to first and second detectors 10 and 11. As shown in FIG. 4A, the laser beam La is converged at a non-detecting region between a couple of detecting regions 10A and 10B of first detector 10, while the laser beam Lb is converged at a non-detecting region between a couple of detecting regions 11A and 11B of second detector 11. Therefore, when optical head 4 is in the focused state, signals of equal level are generated from a couple of detecting regions 10A and 10B and likewise, signals of equal level are generated from a couple of detecting regions 11A and 11B. Accordingly, subtractors 28 and 29 generate focusing error signals of zero level difference. When the optical disk is off the correct focusing position indicated by the alternate long and short dash lines as shown in FIGS. 4B and 4C, convergence spots A and B are formed at positions not on the surface of record layer 3. Therefore, the laser beam La reflected from first auxiliary Fresnel reflecting region 15 is reflected from recording layer 3 in a direction different from the direction in the focused state and directed to second auxiliary Fresnel reflecting region 16. Likewise, the laser beam Lb reflected from second auxiliary Fresnel reflecting region 16 is reflected from record layer 3 in a direction different from the direction in the focused state and directed to first auxiliary Fresnel reflecting region 15. The laser beams La and Lb reflected from fist and second auxiliary Fresnel reflecting regions 15 and 16 are directed respectively to first and second detectors 10 and 11. As shown in FIGS. 4B and 4C, however, in the defocused state, the laser beam La is directed to either of a couple of detecting regions 10A and 10B of first detector 10. Similarly, the laser beam Lb is directed to either of a couple of detecting regions 11A and 11B of second detector 11. Therefore, in the defocused state, signals of different levels are generated from a couple of detecting regions 10A and 10B. Similarly, signals of different levels are generated by a couple of detecting regions 11A and 11B. Signals corresponding to differences are given by subtractors 28 and 29 and are added by adder 30 which then generates a focusing error signal of plus or minus level. In response to the focusing error signal, optical head 4 is moved such that it is kept in the focused state. This focusing error detecting method is so called as off axis method.

Figure 5A:
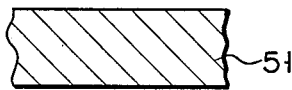
Figure 5B:
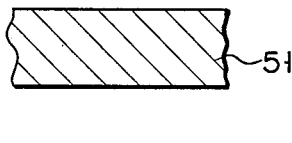
Figure 5C:
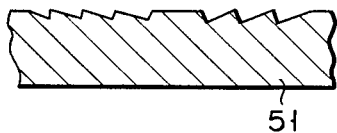
Figure 5D:
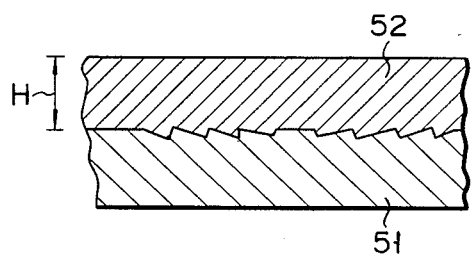

Next, the method of manufacturing converging-structured layer 6 having a Fresnel structure will now be described with reference to FIGS. 5A through 5I. Mirror-finished copper plate 51 which serves as a master plate, as shown in Fig. is prepared, The mirror-finished surface is cut with a cutting tool to form grooves in a Fresnel structure to provide a function as a concave lens as shown in FIG. 5B. Then, copper plate 51 which has been machined as shown in FIG. 5C is oxidized slightly on its surface. After the oxidized surface is peeled off, the exposed surface is laminated by electrolytic plating with a nickel layer with thickness H of preferably 0.2 mm to 2.0 mm as shown in FIG. 5D. Thus, a nickel-plated copper plate for use as converging-structured layer 6 of an optical head is prepared.

After the reverse side of the nickel-plated copper plate is polished by chemical polishing, base plate 54, 5 to 10 mm thick, which serves as a backing, is glued with adhesive layer 53 to nickel layer 52 of the nickel-plated copper plate as shown in FIG. 5E. This base plate may be of glass material such as float glass or toughened glass or metallic material such as aluminum, iron or stainless steel. After adhesive layer 53 has hardened, nickel plating layer 52, which serves as converging-structured layer 6, is separated from copper plate 51 as shown in FIG. 5F. According to this method, it is possible to produce nickel plating layer 52 for plurality of converging-structured layer 6 by using a single piece of copper plate 51 serving as a master plate, making it possible to produce optical head 4 at lower production cost.

Next, light detecting layer 12 is formed at a specified area of converging-structured layer 6. More specifically, as shown in FIG. 5G, with the areas other than a specified area on converging-structured layer 6 masked, ITO layer 56 700 to 800 Å thick, consisting of InTiO is formed on the specified area as shown in FIG. 5G. In addition, amorphous silicon layer 55 1 to 3 μm thick is formed on ITO layer 56 as shown in FIG. 5H. After a laminated body of ITO layer 56 and amorphous silicon layer 55 has been formed, this laminated body is subjected to annealing in an atmosphere of 150° C. As a result, a Schottky barrier layer is formed in the interface. Then, as shown in FIG. 5I, SiO$_2$ layer 57 having 700 to 800 Å thick is formed on amorphous silicon layer 55. On the surface of SiO$_2$ layer, mesa coating is 58 is applied to form a transparent electrode. Thus, a light converging and detecting structure having light detecting layer 12 for an optical head is completed.

Figure 6:
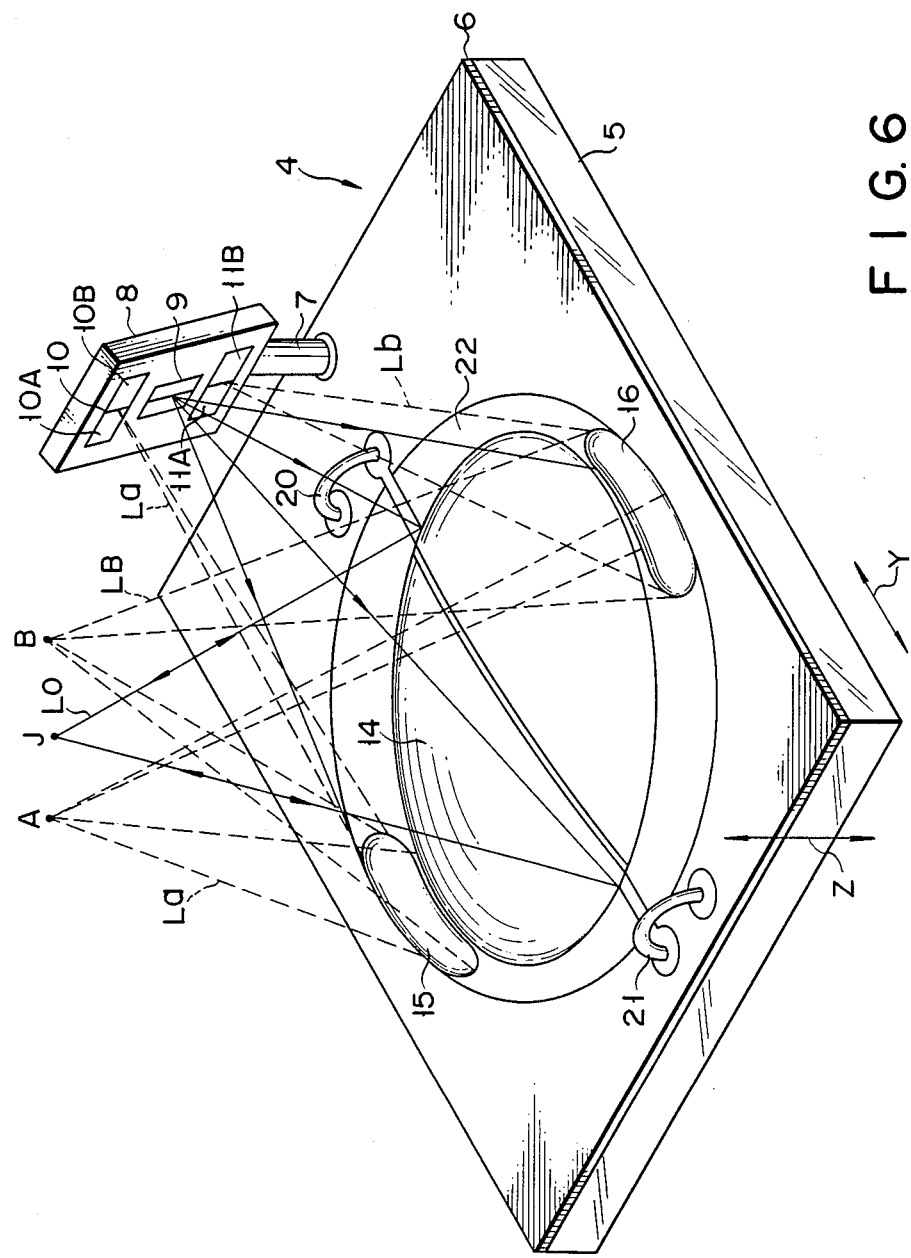
FIG. 6 is a perspective view schematically showing a flat type optical head having a combination construction of a mirror and an objective lens according to another embodiment of this invention.
Figure 7:
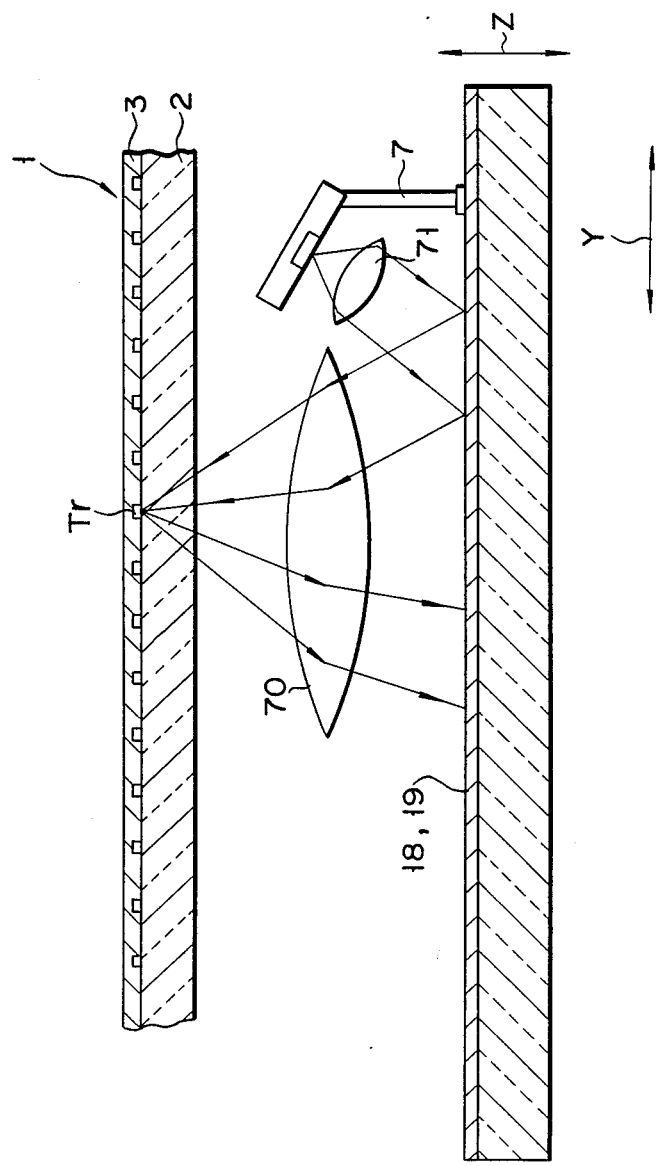
FIG. 7 is a sectional view schematically showing a flat type optical head having a structure of a Fresnel mirror according to a still another embodiment of this invention.

A flat type optical head according to another embodiment of this invention will be described with reference to FIGS. 6 and 7. In FIGS. 6 and 7, the positions and parts designated by the same reference numerals as in FIG. 4 are common and they will not be described here.

In the optical head as shown in FIG. 6, the surface of converging-structured layer 6 is formed in a concave mirror instead of the Fresnel structure and auxiliary reflecting regions 15 and 16 are likewise formed in a concave mirror. Therefore, just as in a reflecting mirror of the aforementioned Fresnel structure, the laser beam emitted from semiconductor laser 9 is focused by this concave-mirror reflecting region 14 at record layer 3. The light beam reflected from record layer 3 is mostly reflected by this reflecting region 14 and a part of the light beam is detected by light detecting regions 18 and 19 of light detecting layer 12. Signals from detectors 18 and 19 are processed and converted into tracking signals and information signals. The laser beams directed toward auxiliary reflecting regions 15 and 16 are reflected by these regions and converged toward record layer 3 and again reflected by record layer 3 toward auxiliary reflecting regions 15 and 16. The laser beams are then reflected by reflecting regions 15 and 16 and directed toward detectors 10 and 11. Signals from detectors 10 and 11 are processed and converted into focusing error signals. An optical head having the concave mirror structure as shown in FIG. 5 can be produced by the same production method as with an optical head having a Fresnel structure described with reference to FIGS. 4A through 4I. Reductions in thickness and weight that have been described in the above embodiments of this invention can be materialized also in the optical head as shown in FIG. 5.

Instead of reflecting region 14 of concave structure as shown in FIGS. 6 and 7, it is also possible to make flat-surfaced reflecting region 14, dispose objective lens 70 between reflecting surface 14 and record layer 3 and install convergent lens 71 for directing the laser beam toward reflecting surface 14 between reflecting surface 14 and semiconductor laser 9.

In the optical head as shown in FIG. 7, the divergent laser beam emitted from semiconductor laser 9 is converged through converging lens 71, directed toward reflecting region 14 and strikes reflecting region 14 at an incident angle of less than 90°. The laser beam reflected regularly by this reflecting region 14 is focused through objective lens 70 at record layer 3 and reflected by the surface of the record layer. The reflected laser beam again passes through objective lens 71 and detected by light detecting regions 18 and 19 formed on base 5. In this embodiment of the present invention, too, signals from light detectors 18 and 19 are processed and converted into tracking and information signals. In the optical head as shown in FIG. 7, a Fresnel reflecting surface as shown in FIG. 2 or concave mirror regions 15 and 16 may be provided for focus detection.

In the above embodiments, description has been made of optical head 4 employing a Fresnel structure or a concave mirror structure, but this invention is not limited to such applications and a grating focusing and reflecting surface structure or hologram reflecting surface structure may be adopted for optical head 4. When a grating focusing and reflecting surface structure or a hologram reflecting surface structure is adopted, a glass plate coated with a chromium layer is used as a master plate for masking. Chromium is vapor-deposited on a float glass, which is then coated with a photoresist. The whole coated material is exposed by an electron beam exposure system and developed. The developed material is etched by chemical etching, laminated with an SiN layer by vapor deposition and coated with a photoresist. The photoresist-coated surface is covered with the chromium mask as a master plate and the whole area of the material is exposed to radiation. Then, the SiN layer is etched and selectively removed. To impart electric conductivity and light reflectivity, aluminum or chromium is vapor-deposited on the surface. Thus, a focusing and detecting layer is formed on the base plate.

What is claimed is:

1. An optical apparatus for focusing a light beam onto an optical memory comprising:
   means for generating a light beam;
   reflecting means for reflecting the light beam incident thereon and converging the light beam toward the optical memory; and
   detecting means for detecting the light beam which is incident on the optical memory and is reflected therefrom and for generating an electrical signal.

2. The optical apparatus according to claim 1, wherein said reflecting means includes a Fresnel reflecting mirror having a Fresnel reflecting surface.

3. The optical apparatus according to claim 1, wherein said reflecting means includes a concave reflecting mirror structure having a concave reflecting surface.

4. The optical apparatus according to claim 1, wherein the reflecting means and detecting means are formed in a same structure which has a reflecting region and a detecting region for detecting the incident light beam and converting it into electric signals.

5. The optical apparatus according to claim 1, wherein said reflecting means includes first, second and third reflecting regions which reflect and separate the incident light beam from said light beam generating means into first, second and third light beam and converge the reflected light beams toward the optical memory, the first light beam incident on the first reflecting region and reflected from the optical memory being projected on the first reflecting region, the second light beam incident on the optical memory from the second reflecting region and reflected from the optical memory being projected to the third reflecting region and reflected therefrom, the third light beam incident on the optical memory from the third reflecting region and reflected from the optical memory being projected to the second reflecting region and reflected therefrom.

6. The optical apparatus according claim 5, further comprising second and third detecting means for detecting second and third light beams and converting these light beams into second and third electric signals, said second and third detecting means each having a couple of detecting regions.

7. The optical apparatus according to claim 6, further comprising means for processing the second and third electric signals and generating a focusing signal.

8. The optical apparatus according to claim 7, further comprising a mechanism for moving the optical head substantially perpendicularly to the optical memory.

9. The optical apparatus according to claim 1, further comprising means for processing the detection signal from the detecting means and converting this signal into an information signal.

10. The optical apparatus according to claim 1, further comprising means for processing the first detection signal from the first detecting means and generating a tracking signal.

11. The optical apparatus according to claim 10, further comprising a mechanism for moving the optical apparatus substantially in parallel with the optical memory according to a tracking signal.

12. An optical apparatus for focusing a light beam onto an optical memory comprising:
   means for generating a light beam; and
   a multi-layered structure on which the light beam is incident, said multi-layered structure comprising a first layer having a reflecting region that reflects the light beam toward the optical memory and a second layer having a detecting region for detecting a light beam incident thereon from said light beam generating means and a light beam reflected from the optical memory.

13. The optical apparatus according to claim 12, wherein the detecting region of the second layer is separated into a couple of sections, each generating a detection signal.

14. The optical apparatus according to claim 13, further comprising means for adding detection signals from the couple of sections and covering the detection signals into an information signal.

15. The optical apparatus according to claim 12, further comprising means for calculating a difference of detection signal from the couple of section and generating a tracking signal.

16. The optical apparatus according to claim 15, further comprising a mechanism for moving the optical head substantially in parallel with the optical memory according to a tracking signal.

* * * * *